Jan. 12, 1954    F. X. KEEGAN    2,666,193
SELF-ALIGNING DUAL PURPOSE WARNING HEADLIGHT APPARATUS
Filed May 14, 1951    2 Sheets-Sheet 1

Inventor
Frank X. Keegan

Jan. 12, 1954 F. X. KEEGAN 2,666,193
SELF-ALIGNING DUAL PURPOSE WARNING HEADLIGHT APPARATUS
Filed May 14, 1951 2 Sheets-Sheet 2
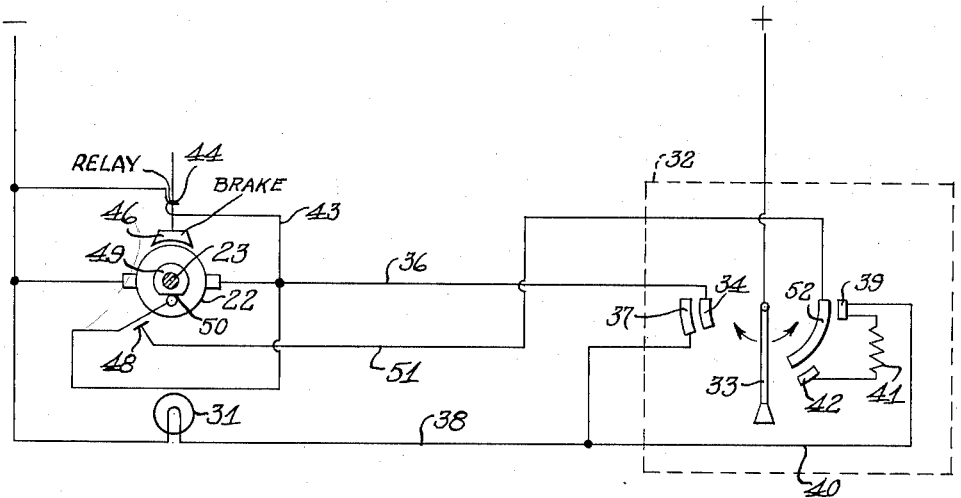
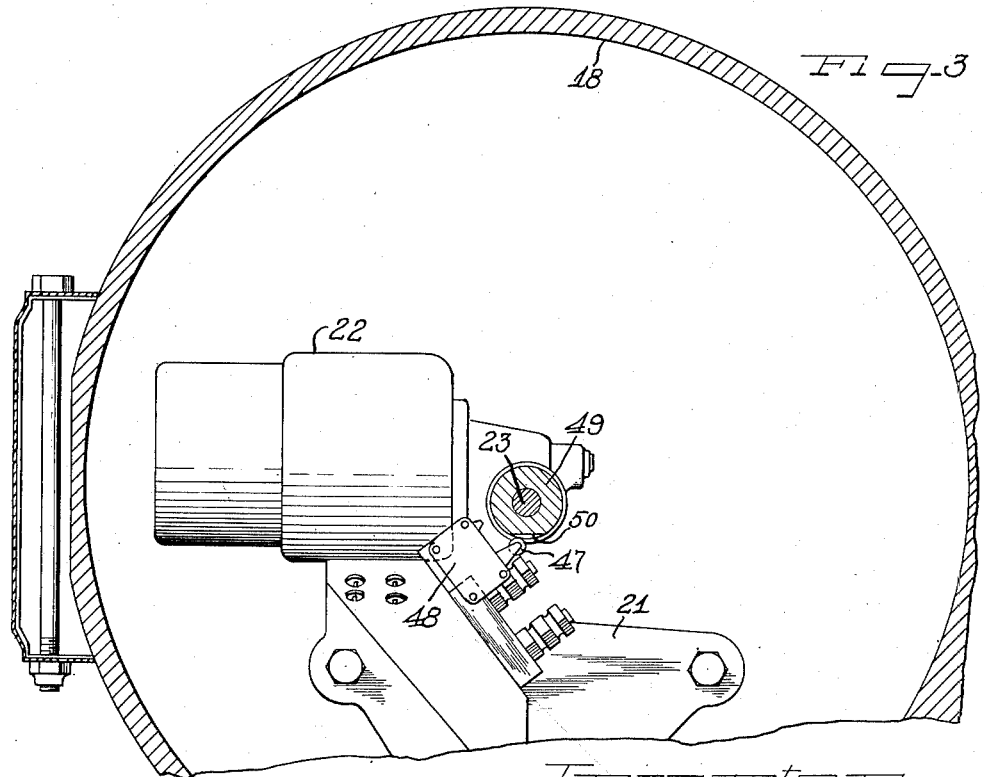
Frank X. Keegan Patented Jan. 12, 1954

2,666,193

UNITED STATES PATENT OFFICE 2,666,193

SELF-ALIGNING DUAL PURPOSE WARNING HEADLIGHT APPARATUS

Frank X. Keegan, Chicago, Ill., assignor to The Pyle-National Company, Chicago, Ill., a corporation of New Jersey Application May 14, 1951, Serial No. 226,183

5 Claims. (Cl. 340—49)

This invention relates generally to illumination apparatus and more particularly to a self-aligning dual purpose warning headlight apparatus wherein a rotatable reflector mechanism powered by a selectively operable motor is used to project a light of emission from a light source as a beam of light movable in accordance with a predetermined motion pattern, the reflector mechanism being alignable in a locked position to project a stationary beam of light so that the apparatus may develop the dual function of operating either as a warning light having improved visibility characteristics, or as a headlight with the projected beam directed along a predetermined reflection axis.

In the warning light structures heretofore provided, motorized reflecting means have been provided by means of which a projected beam of light may be moved through a predetermined motion pattern. Deenergization of the motor used to move the movable reflecting means in order to project a stationary beam of light has resulted heretofore in the projection of the stationary beam on various reflection axes intersecting different points along the path forming the motion pattern.

This operating characteristic is particularly undesirable in application where it is desired to develop the dual function of utilizing the warning light apparatus as a headlight.

For example, if the warning light apparatus is mounted on the front end of a movable vehicle, such as a railway locomotive, the movable beam pattern is generally arranged to provide a transverse beam sweeping action across the railway road bed, as well as a vertical sweeping action utilized to produce a spectacular sky light effect. For greatest utility as a headlight structure, however, it is desirable that the beam of projected light be aligned on an axis of reflection extending parallel to the tracks of the railway road bed.

In accordance with the principles of the present invention, a motorized movable reflector means associated with a suitable light source is concurrently energized by a first circuit means to project a movable beam of light along a path forming a predetermined motion pattern. A second circuit means is provided to solely energize only the source of light for projecting a stationary beam of light when it is desired to operate the apparatus as a headlight. A selector switch is also provided to control the selective energization of either of the circuit means. In addition, a braking circuit means including a locking device engaging the movable reflector mechanism is controlled by a brake switch having an actuator carried by the movable reflector means. The braking circuit means is interlocked with the selector switch and the actuator is arranged to actuate the brake switch whenever the second circuit means is energized. The beam of projected light is thus aligned on an axis of reflection intersecting a predetermined point along the path forming the motion pattern, which point may be selectively chosen to coincide with the optimum position required in the efficient operation of the structure as a headlight.

It is an object of the present invention, therefore, to provide a self-aligning dual purpose warning headlight structure.

Another object of the present invention is to provide a warning light structure having a beam projecting mechanism arranged to project a movable beam of light on a path forming a predetermined motion pattern and including means to automatically position the beam projecting mechanism in predetermined alignment when the beam projecting mechanism is stationarily positioned.

Yet another object of the present invention is to provide an improved aligning mechanism for a headlight apparatus to position a projected beam of light on a predetermined axis of reflection.

Many other features, advantages and additional objects of the present invention will become manifest to those versed in the art upon making reference to detailed description which follows and the accompanying sheets of drawings in which a preferred structural embodiment of a dual purpose warning headlight incorporating the principles of the present invention is shown by way of illustrative example.

On the drawings:

Figure 3 is a cross-sectional view taken substantially on line III—III of Figure 2; and Figure 4 is a circuit diagram showing the control circuit provided in accordance with the principles of the present invention.

As shown on the drawings:

Figure 1:
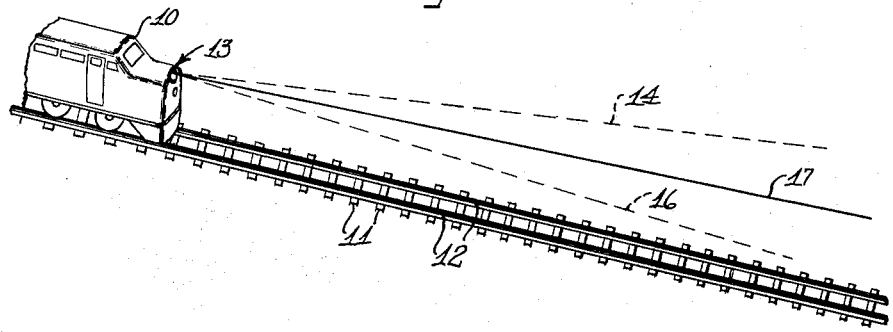
Figure 1 is a diagrammatic view of a railway locomotive having a warning headlight constructed in accordance with the principles of the present invention.

Although the principles of the present invention are of general utility insofar as their application to other types of illumination apparatus are concerned, the present disclosure is based for purposes of illustrative example upon the provision of a dual purpose warning headlight of the type frequently employed on the front end of a locomotive indicated diagrammatically in Fig. 1 at 10.

The locomotive 10 is shown proceeding on a road bed of a railroad right of way including a plurality of ties 11 upon which are mounted a pair of parallel rails 12. The warning headlight of the present invention indicated generally by the reference numeral 13 is mounted in the front end of the locomotive and is arranged to project a movable beam of light along a path forming a predetermined motion pattern.

The warning light apparatus 13 is preferably of the type wherein the path of movement forming the motion pattern includes a horizontal beam sweep which extends transversely across the road bed carrying the rails 12 from an extreme lateral position indicated by the dotted line 14 on one side of the road bed to an extreme lateral position indicated by the dotted line 16 on the other side of the road bed.

The motion pattern further includes a vertical sweep tending to create a spectacular sky effect to improve the visbility characteristics of the warning light apparatus 13.

For most efficient use as a headlight unit, the beam of projected light emanating from the warning light apparatus 13 should be aligned on an axis of reflection indicated in solid lines at 17, the axis 17 being generally parallel to the tracks 12 and in coaxial alignment relative to the longitudinal path of movement of the locomotive 10.

Figure 2:
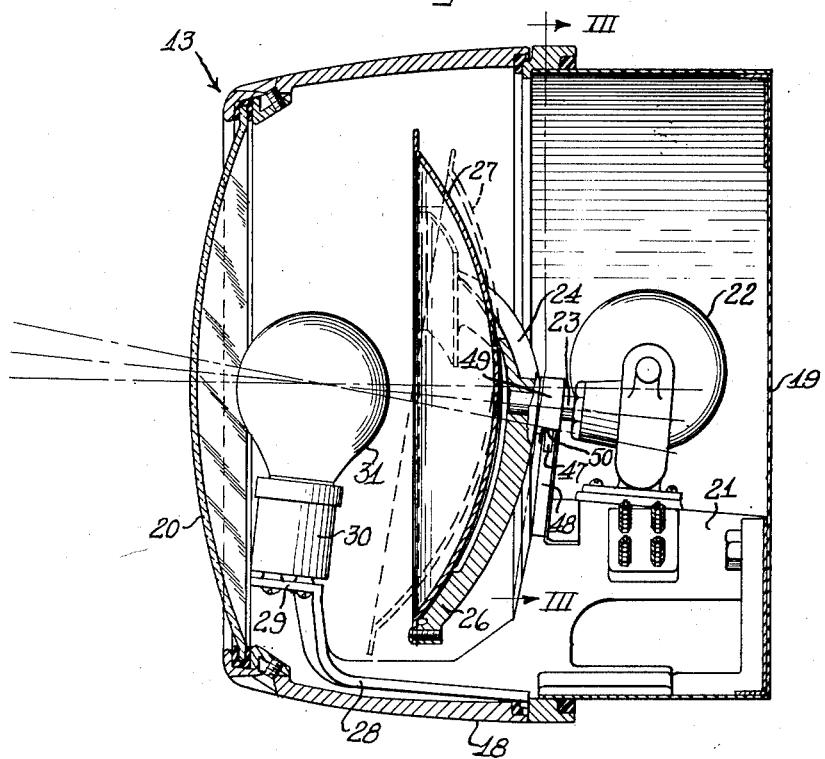
Figure 2 is a cross-sectional view with parts shown in elevation and with parts removed for the sake of clarity showing a warning headlight constructed in accordance with the principles of the present invention.

Although other types of warning light apparatus can advantageously employ the principles of the present invention, the warning light apparatus 13 is shown in Figure 2 as comprising a casing 18 having a closed end 19 and an open end receiving a clear lens 20. A mounting shoe 21 is firmly assembled in the casing 18 adjacent the closed end 19 and mounts a prime mover taking the form of an electric motor 22 which is used to rotatably drive a power delivery shaft 23.

On the end of the power delivery shaft 23 is mounted a spider 24 having a plurality of radially extending arm portions 26 which position and carry a parabolic reflector 27. The arm portions 26 of the spider 24 are arranged to position the parabolic reflector 27 in eccentrically offset relation relative to the rotational axis of the power delivery shaft 23, thereby to oscillate the reflector 27 upon rotation of the shaft 23.

The mounting shoe 21 includes a bracket portion 28 having an upstanding pedestal 29 mounting a socket 30 receiving an incandescent bulb 31 forming a light source. The bulb 31 is positioned with its filament located approximately at the focal center of the reflector 27 so that the light of emission emanating therefrom will be projected as a beam of light outwardly through the lens 20. When the motor 22 is operated, the shaft 23 will be rotated and the reflector 27 will be oscillated to project a movable beam of light on a conical path forming a motion pattern including a transverse sweeping effect, as well as a vertical sweeping effect.

Referring now to Figure 4, the control circuit provided in accordance with the present invention is shown. A selector switch is indicated at 32 and includes a movable arm 33 made of electrically conductive material and connected to a suitable source of current which, in this illustrative embodiment, is shown as the plus side of an electrical source.

By moving the arm 33 to the left (as shown in Fig. 4), electrical connection is made with a contact 34 forming a portion of the circuit means 36 provided for energizing the electric motor 22 and connected in circuit with the negative side of the electrical source to complete the electrical energization of the motor 22.

Upon engaging the contact 34 the arm 33 concurrently engages the contact 37 which forms a part of the circuit means 38 provided for energizing the bulb 31.

Upon moving the arm 33 to the extreme right position, a completed circuit connection is made through the contact 39 forming a part of the circuit means 40 provided to solely energize only the light bulb 31. A dimming resistance 41 is provided, as well as an additional contact 42 so that the arm 33 may be selectively moved between the contacts 39 and 42 to vary the intensity of the light emanating from the bulb 31.

Under ordinary circumstances, upon deenergization of the motor 22, for example, when the arm 33 is moved away from the contact 34 the reflector 27 will stop at some intederminate point in the path of movement forming the motion pattern. According to the principles of the present invention, an aligning mechanism is provided to insure self-alignment of the projector 27 whenever the bulb 31 is solely energized, or in other words, whenever the motor 22 is deenergized.

In the embodiment of Fig. 4, the self-aligning mechanism includes a braking circuit means indicated at 43 and including a relay 44 provided to power a brake 46 associated with the motorized reflector means. A switch is placed in control of the braking circuit means, for example, a microswitch having an actuating arm 47 engageable with a contact 48 may be provided. An annular collar 49 having a flattened portion 50 is firmly connected to the shaft 23 and is arranged in operative relationship to the arm 47 to actuate the switch.

The switch in control of the braking circuit means 43 is interlocked with the selector switch 32 by means of a circuit connector 51 which electrically joins the contact 48 to a contact member 52.

It will be noted that the relay 44 is energized upon completion of the circuit means 36 through the contact 34 and the arm 33 so that the brake 46 will be retained out of operative position, however, when the arm 33 is moved toward the contact 39, the contact 52 is concurrently closed so that the relay 44 will be deenergized upon movement of the switch arm 47 onto the flat portion 50 of the actuating collar 49, thereby breaking electrical connection with the contact 48. As soon as the relay 44 is deenergized, the brake is immediately applied and serves to lock the movable reflector means in a predetermined alignment corresponding to the angular orientation of the flattened portion 50 relative to the positioning of the annular collar 49 on the shaft 23.

It will be apparent that the arrangement illustrated by the brake 46 and the relay 44 could take a number of mechanical forms, for example, the brake 46 may comprise a friction shoe engageable with a portion of the shaft 23, or a well known type of eddy current brake could be provided, the energization of which being controlled by the braking circuit means 43.

It will be understood that as applied to the embodiment of Figure 1, the flattened portion 50 would be aligned relative to the shaft 23 to lock the reflector 27 in position to project a beam of light along the reflection axis 17, thus permitting the warning light apparatus 13 to function most efficiently as a headlight when a stationary beam of light is projected.

Although various minor structural modifications might be made to the preferred embodiment herein described by way of illustrative example, it should be understood that I wish to embody within the scope of this invention all such modifications as reasonably and properly come within the scope of my contribution to the art.

I claim as my invention:

1. A warning light comprising, a source of light, a motorized movable reflector means associated with said source of light to project a movable beam of light in a motion pattern, a first circuit means to concurrently energize said light source in said motorized reflector means, a second circuit means to solely energize only said source of light to produce a stationary beam of light, a selector switch to control the selective energization of said first and second circuit means, braking circuit means including a locking mechanism engaging said movable reflector means to align the beam of light at a predetermined point in the motion pattern, a brake switch in control of said braking circuit means, and an actuator for said brake switch carried by said movable reflector means to energize said braking circuit means in response to the sole energization of said second circuit means only.

2. A warning light as defined in claim 1, wherein said motorized reflector means more particularly comprises an electric motor having a rotatable shaft extending toward said light source, said shaft carrying a parabolic reflector eccentrically offset relative to said shaft.

3. A warning light as defined in claim 2 wherein said actuator more specifically comprises an annular collar on said shaft having a flat formed on the peripheral surface thereof to cooperate with said brake switch.

4. A warning light as defined in claim 3, wherein said actuator more specifically comprises an angularly adjustable collar and locking means for locking said collar in adjusted position on said shaft, thereby to align the beam of light at any selective point in the motion pattern.

5. A warning light as defined in claim 1, and a casing open at one end receiving said warning light, said casing having a lens in the open end thereof through which the beam of light is projected, whereby the warning light and casing comprises an integral warning light unit.

FRANK X. KEEGAN.

References Cited in the file of this patent

UNITED STATES PATENTS

| Number | Name | Date |
|---|---|---|
| 1,472,186 | Morris | Oct. 30, 1923 |
| 1,654,943 | Nott | Jan. 3, 1928 |
| 2,008,408 | Thompson | July 16, 1935 |
| 2,446,333 | Kennelly | Aug. 3, 1948 |
| 2,464,318 | Kennelly | Mar. 15, 1949 |
| 2,510,892 | Kennelly | June 6, 1950 |
| 2,607,838 | McDowell | Aug. 19, 1952 |